United States Patent [19]

Urban

[11] Patent Number: 5,237,015

[45] Date of Patent: Aug. 17, 1993

[54] CORE-SHELL POLYMER FOR USE IN TIRE TREADS

[75] Inventor: Paul C. Urban, Sarnia, Canada

[73] Assignee: Polysar Rubber Corporation, Sarnia, Canada

[21] Appl. No.: 787,507

[22] Filed: Nov. 4, 1991

[51] Int. Cl.$^5$ .................... C08F 257/02; C08F 279/04
[52] U.S. Cl. ................................. 525/316; 525/902; 526/340
[58] Field of Search ................ 526/340; 525/902, 316

[56] References Cited

U.S. PATENT DOCUMENTS

| | | | |
|---|---|---|---|
| 2,384,547 | 9/1945 | Fryling . | |
| 3,305,516 | 2/1967 | Smith | 260/33.6 |
| 4,855,337 | 8/1989 | Dequatre et al. | 525/902 |
| 5,034,462 | 7/1991 | Stiberth et al. | 523/201 |

OTHER PUBLICATIONS

Abstract–Japanese Patent 75 038 133–date Dec. 8, 1975–Bridgestone Tire Co. Ltd.
Paper presented 125th meeting of the Rubber Division, ACS, pp. 178–185, May 8–11, 1984–The "Integral Rubber"–An Approach To An Ideal Tire Tread Rubber.

Primary Examiner—Paul R. Michl
Assistant Examiner—Olga Asinovsky
Attorney, Agent, or Firm—Joseph C. Gil; Godfried R. Akorli

[57] ABSTRACT

A novel rubbery polymer suitable for use in tire tread formulations is characterized in that the polymer comprises polymer particles which have from 2 to 6 domains, each domain comprising from 100 to about 40 weight percent of at least one $C_4$ to $C_8$ conjugated diolefin monomer, from 0 to about 60 weight percent of at least one $C_3$ 3 to $C_6$ alkenyl nitrile monomer and from 0 to about 60 weight percent of at least one $C_8$ to $C_{12}$ monovinylidene aromatic monomer for a total of 100 weight percent of the domain, the monomer composition and/or molecular weight of one domain of each polymer particle differing from the monomer composition and/or molecular weight of each of the other domains of the polymer particle. A process for the production of the rubbery polymer is provided together with a rubber composition comprising the rubbery polymer and at least one diene-based polymer.

20 Claims, 6 Drawing Sheets

FIG. 2.

14
CORE-SHELL POLYMER FOR USE IN TIRE TREADS

FIELD OF INVENTION

This invention relates to rubbery polymers based on at least one alkenyl nitrile monomer, at least one conjugated diolefin monomer and at least one monovinylidene aromatic monomer, a process for their preparation and their use in the manufacture of tires.

BACKGROUND OF THE INVENTION

It is generally accepted that elastomers which are to be used in the manufacture of tires must satisfy a number of criteria. In particular, the cold creep of the elastomers must be as low as possible; the elastomers must be readily processable in subsequent blending processes; the elastomers must be flowable during the molding processes and the elastomers must be readily vulcanizable.

With the increasing demand for automobile safety and low fuel consumption, the specifications for tire tread elastomeric compounds have become more exacting. Tire treads are now required to retain their elastomeric characteristics over a wide temperature range, to have high abrasion resistance in order to provide a long life expectancy, to exhibit good anti-skid properties in both wet and dry conditions and to have low hysteresis characteristics at elevated temperatures, that is to have good rebound characteristics and resilience in order to provide low rolling resistance and reduced dynamic heat build-up.

These specifications for tire treads are partly contradictory in that in order to improve the rolling resistance and the dynamic heat build-up, the damping properties of the tire tread compounds must be lowered. These in turn affect the wet traction properties and thus allow but a small margin for alterations in tread compounding.

By subjecting elastomeric vulcanizates to torsional vibration tests, measurements of the mechanical loss factor tan delta can be made which give an indication of the hysteresis power loss in the vulcanizates as they flex. Measurements of tan delta at different temperatures when expressed in the form of a graph, afford a curve whose slope gives an indication as to the performance of the vulcanizate with respect to its viscoelastic properties.

In Kautschuk und Gummi, Kunstoffe 38, 178 (1985), K. H. Nordsiek has demonstrated that the aforesaid specifications for tire tread compounds can be met if the tan delta curve comprises a vibration damping range which is as wide as possible. Furthermore, the value of tan delta should be relatively low at temperatures above 70° C. so that there is minimal dynamic heat build-up and also in the temperature range between 30° C. and 70° C. so that rolling resistance is at a minimum. In the temperature range between 0° and 30° C. the value of tan delta should be relatively high in order for there to be superior skid resistance and there should be a subsequent flat increase in the value of tan delta to a maximum value at the lowest possible temperature so that there is excellent abrasion resistance and the rubbery characteristics of the tire tread are maintained.

Homopolymers based on the conventionally employed monomeric raw materials such as butadiene, isoprene and styrene do not satisfactorily meet these requirements. For example, high cis-1,4-polybutadiene provides vulcanizates having good wear resistance and good resilience together with an acceptably low glass transition temperature but the vulcanizates are lacking in both wet and dry traction, except perhaps on ice. High vinyl polybutadienes, on the other hand, are deficient in wear resistance and resilience and the glass transition temperature is too high to permit their use in colder climates.

The blending of homopolymers and copolymers has also not proven to be completely satisfactory in that the resultant tire tread compounds do not exhibit the aforesaid spectrum of properties. For example, blends of emulsion and solution polymers such as blends of styrene-butadiene copolymers and high vinyl polybutadienes have good wet skid resistance and acceptably low rolling resistance but they are deficient in other properties such as abrasion resistance.

Accordingly there exists a need for elastomers which substantially satisfy the aforesaid desired properties.

DESCRIPTION OF PRIOR ART

The preparation of covulcanizable blends of rubbery polymers in an attempt to obtain compositions with an acceptable balance of properties contributed by the individual polymers, for use in automobile tire tread compounds, is well known. The deficiencies of blends of high cis-1,4-polybutadienes with oil-extended rubbery styrene-butadiene copolymers in traction have been recognized. Accordingly blends thereof with other rubbers such as acrylonitrile-butadiene copolymers have been proposed.

U.S. Pat. No. 3,305,516 (Goodyear) discloses that a rubbery composition comprising 10 to 30 parts by weight of a rubbery copolymer of acrylonitrile and 1,3-butadiene, 20 to 50 parts by weight of an oil extended rubbery copolymer of styrene and 1,3-butadiene (calculated excluding said oil) and 20 to 60 parts by weight of a rubbery polymer of cis-1,4-butadiene, upon vulcanization exhibits improved traction relative to a vulcanizate of an oil-extended styrene-butadiene copolymer and to a vulcanizate of a styrene-butadiene copolymer, cis-1,4-polybutadiene blend.

The use of elastomeric acrylonitrilebutadiene-styrene terpolymers both alone and in blends with other polymers, in tire tread formulations is also known.

U.S. Pat. No. 2,384,547 (B. F. Goodrich) discloses that a rubbery acrylonitrile-butadiene-styrene terpolymer comprising from 65 to 80 percent by weight butadiene and from 20 to 35 percent by weight of approximately equal amounts of acrylonitrile and styrene, when in prolonged contact with gasoline and mineral oils swells to a limited extent but does not degrade and this is suitable for use in a self-sealing fuel hose for aircraft as well as in tires, tubes and belts.

Japanese Kokohu 75 038 133 (Bridgestone Tire Co. Ltd.) discloses that a rubber composition comprising 100 parts of natural rubber, 40 parts of carbon black, 10 parts of an acrylonitrile-butadiene-styrene terpolymer wherein the monomers are present in the ratio 36:15.5:58.5, various softeners, vulcanization agents and regulators, and antioxidants, upon vulcanization affords a tire tread that exhibits 5.1 cuts per 100 cm$^2$ whereas a rubber composition that does not contain the terpolymer, when vulcanized is found to exhibit 15 cuts per 100 cm².

European Patent Application 366 915 (Continental A.G.) discloses that in a rubber composition suitable for tire treads, the rubber component may consist solely of an acrylonitrilebutadiene-styrene terpolymer or a blend of the terpolymer with at least one conjugated diene containing polymer, the terpolymer having an acrylonitrile content of between 10 and 50 weight percent, a butadiene content of between 40 and 80 weight percent and a styrene content of between 10 and 40 weight percent, for a total of 100 weight percent terpolymer, the terpolymer being further characterized by a total acrylonitrile and styrene content of between 20 and 60 weight percent and a glass transition temperature in the range of $-60°$ to $0°$ C. By controlling the polarity and the glass transition of the terpolymer, the abrasion resistance and handling are improved while good wet skid resistance and low rolling resistance are maintained.

SUMMARY OF THE INVENTION

It is an objective of the present invention to provide novel rubbery polymers based on at least one alkenyl nitrile monomer, at least one conjugated diolefin monomer and at least one monovinylidene aromatic monomer suitable for use in tire tread formulations.

It is a further objective of the present invention to provide a process for preparing such rubbery polymers It is yet a further objective of the present invention to provide compositions comprising said rubbery polymers which upon vulcanization exhibit improved dynamic properties.

Accordingly the present invention provides a rubbery polymer suitable for use in tire tread formulations comprising from about 5 to 55 weight percent of at least one $C_3$ to $C_6$ alkenyl nitrile monomer, from about 40 to 80 weight percent of at least one $C_4$ to $C_8$ conjugated diolefin monomer and from about 5 to 55 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C\pm$ to $C_4$ alkyl group or a chlorine or bromine atom for a total of 100 weight percent of said rubbery polymer characterized in that the polymer comprises polymer particles which have from 2 to 6 domains wherein each domain comprises from 100 to about 40 weight percent of at least one $C_4$ to $C_8$ conjugated diolefin monomer, from 0 to about 60 weight percent of at least one $C_3$ to $C_6$ alkenyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said domain, the monomer composition of one domain of each polymer particle differing from the monomer composition of each of the other domains and/or the molecular weight of one domain of each polymer particle differing from the molecular weight of each of the other domains, and any one domain of the polymer particles comprises from about 5 to 95 weight percent of the polymer particles.

In another of its aspects the present invention provides a process for the preparation of a rubbery polymer comprising from about 5 to 55 weight percent of at least one $C_3$ to $C_6$ alkenyl nitrile monomer, from about 40 to 80 weight percent of at least one $C_4$ to $C_8$ conjugated diolefin monomer and from about 5 to 55 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said rubbery polymer characterized in that the process comprises from 2 to 6 sequential free radical polymerization reactions in aqueous emulsion wherein the polymer formed in each polymerization reaction comprises from about 100 to 40 weight percent of at least one conjugated diolefin monomer, from 0 to about 60 weight percent of at least one $C_3$ to $C_6$ alkenyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said polymer, the monomer composition of the polymer formed in one polymerization reaction differing from the monomer composition of the polymer formed in each of the other polymerization reactions and/or the molecular weight of the polymer formed in one polymerization reaction differing from the molecular weight of the polymer formed in each of the other polymerization reactions, and the polymer formed in one polymerization reaction comprises from about 5 to 95 weight percent of the total polymer formed.

In yet another of its aspects the present invention provides a rubber composition the vulcanizate of which has improved dynamic properties comprising:

(i) 100 to about 10 parts by weight of a rubbery polymer conprising from about 5 to 55 weight percent of at least one $C_3$ to $C_6$ alkenyl nitrile monomer, from about 40 to 80 weight percent of at least one $C_4$ to $C_8$ conjugated diolefin monomer and from about 5 to 55 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said rubbery polymer characterized in that the polymer comprises: polymer particles which have from 2 to 6 domains wherein each domain comprises from 100 to about 40 weight percent of at least one $C_4$ to $C_8$ conjugated diolefin monomer, from 0 to about 60 weight percent of at least one $C_3$ to $C_6$ alkyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said domain, the monomer composition of one domain of each polymer particle differing from the monomer composition of each of the other domains and/or the molecular weight of one domain of each polymer particle differing from the molecular weight of each of the other domains, and any one domain of the polymer particles comprises from about 5 to 95 weight percent of the polymer particles, (ii) 0 to about 90 parts by weight of at least one rubber selected from the group consisting of butadiene rubbers, styrenebutadiene random and block rubbery copolymers, isoprene rubber and natural rubber, for a total of 100 parts by weight of (i) and (ii), (iii) about 30 to about 150 parts by weight of carbon black based on 100 parts by weight of the total of (i) and (ii), (iv) 0 to about 50 parts by weight of aromatic hydrocarbon extender oil based on 100 parts by weight of the total of (i) and (ii), and (v) vulcanization reagents.

As used herein the term domain refers to a region in or on a polymer particle which is different from an adjacent region. The different domains of a heterogeneous particle may in fact form a true core shell structure. Thus the structure of the central core area of the particle will differ from the structure of the surface covering the entire core area. If a domain does not cover the entire surface of the the particle may have a continuous central domain with different and discontinuous domains on the surface of the continuous central domain. There may be instances where there is no clear dividing line between the polymeric compositions of one domain and another domain. Rather, there is a gradual transition in polymer composition from one domain to another. It is intended that the term be applicable to this situation as well as those where there is a relatively clear division such as a core shell or continent situation.

DETAILED DESCRIPTION OF THE INVENTION

This invention relates to a rubbery polymer suitable for use in tire treads which comprises from about 5 to 55 weight percent, preferably from about 10 to 40 weight percent, of at least one $C_3$ to $C_6$ alkenyl nitrile monomer, from about 40 to 80 weight percent, preferably from about 50 to 70 weight percent, of at least one $C_4$ to $C_8$ conjugated diolefin monomer and from about 5 to 55 weight percent, preferably from about 10 to 40 weight percent, of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said polymer.

Representative nonlimiting examples of $C_3$ to $C_6$ alkenyl nitrile monomers which are suitable for use in the rubbery polymers of the present invention include acrylonitrile, methacrylonitrile, 3-butenenitrile and 4-pentenitrile, acrylonitrile and methacrylonitrile being preferred and acrylonitrile being especially preferred. Suitable $C_4$ to $C_8$ conjugated diolefins for use in the present invention include 1,3-butadiene, isoprene, 1,3-pentadiene, 2,3-dimethyl-1,3-butadiene, 2-methyl-1,3-pentadiene and 2,3-dimethyl-l,3-pentadiene. 1,3-Butadiene and isoprene are the preferred $C_4$ to $C_8$ conjugated diolefin monomers, 1,3-butadiene being especially preferred. Representative nonlimiting examples of $C_8$ to $C_{12}$ monovinylidene aromatic monomers which may be substituted in the alpha position on the vinylidene group with at least one $C_1$ to $C_4$ alkyl group or on the aromatic ring with at least one $C_1$ to $C_4$ alkyl group or a chlorine or bromine atom suitable for use in the present invention include styrene, α-methylstyrene, various alkyl substituted styrenes, 1-vinylnaphthalene, p-chlorostyrene, p-bromostyrene and the like; styrene, amethylstyrene, p-methylstyrene, p-chlorostyrene and p-bromostyrene being preferred and styrene being especially preferred.

The polymer comprises polymer particles which have from 2 to 6 domains, preferably from 2 to 4 domains, wherein each domain comprises from 100 to about 40 weight percent of at least one $C_4$ to $C_8$ conjugated diolefin monomer, from 0 to about 60 weight percent of at least one $C_3$ to $C_6$ alkenyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said domain.

As noted earlier the term domain refers to a region in or on a polymer particle which differs from an adjacent region. The different domains of the particle may form a true core shell structure in that the molecular composition of the central core area of the particle differs from the molecular composition of the surface covering the entire core area. However, if a domain does not cover the entire surface of the particle, the particle may have a continuous central domain with different and discontinuous domains on the surface of the continuous domain There may be instances when there is no clear dividing line between the polymer compositions of one domain and another domain. Rather, there is a gradual transition in polymer composition from one domain to another. This may arise when, subsequent to the polymerization of a monomer charge of a specific composition, the residual monomers are not stripped prior to the polymerization of a second monomer charge having a molecular composition different to that of the first monomer charge. It is intended that the term, domain, be applicable to this situation as well as those where there is a relatively clear division such as a core shell or discontinuous domain situation.

Differentiation of the domains of the polymer particles occurs in any one of three possible ways. First, the monomer composition of one domain of each of the polymer particles differs from the monomer composition of each of the other domains of the polymer particles and, in addition, the molecular weight of the aforesaid one domain of each of the polymer particles differs from the molecular weight of each of the other domains of the polymer particles. Second, the monomer composition of one domain of each of the polymer particles differs from the monomer composition of each of the other domains of the polymer particles. Yet a third possible way in which the domains of the polymer particles may differ one from another is that the molecular weight of one domain of each of the polymer particles differs from the molecular weight of each of the other domains of the polymer particles. By varying the monomer composition and/or the molecular weight of the domains of the polymer particles in this manner it is possible to vary the viscoelastic properties of the polymer.

The domains of the polymer particles are further characterized in that any one domain of the polymer particles comprises from about 5 to 95 weight percent of the polymer particles, preferably from about 10 to about 90 weight percent of the polymer particles.

The polymers of the present invention may be prepared using conventional two to six, preferably two to four consecutive emulsion polymerization reactions. In the preparation of the chosen first stage polymer, the comonomers to be employed are typically dispersed, with agitation sufficient to emulsify the mixture, in an aqueous medium which may contain a known free radical polymerization catalyst system and a known emulsifying agent (i.e. surfactant) as well as other ingredients conventionally employed as emulsion polymerization aids. Similarly the second polymerization reaction and each subsequent polymerization reaction is conducted in much the same fashion with the exception that it is conducted in an aqueous medium comprising the latex resulting from the first polymerization or a subsequent polymerization reaction.

Suitable free radical polymerization catalyst systems include water soluble oxidizing agents such as organic peroxides (e.g. t-butylhydroperoxide, cumene hydroperoxide, etc.), inorganic oxidizing agents (e.g. hydrogen peroxide, potassium persulphate, etc.) and redox catalysts in which the oxidizing agent is activated in the water phase by a water soluble reducing agent. Such catalysts are employed in an amount ranging from about 0.03 to about 5 weight percent based upon the total amount of monomers to be polymerized in the reaction. Alternatively, other free radical producing means, such as exposure to activating radiations, can be employed rather than heat and/or catalytic compounds to activate the polymerization.

Suitable emulsifying agents which can be employed include anionic, cationic, and nonionic emulsifiers customarily used in emulsion polymerization. Usually at least one anionic emulsifier is included and one or more nonionic emulsifiers can also be present. Representative types of anionic emulsifiers are the alkyl aryl sulfonates, alkali metal alkyl sulfates, the sulfonated alkyl esters, the fatty acid soaps and the like. Specific examples of these well known emulsifiers include dodecylbenzene sodium sulfonate, sodium butylnaphthalene sulfonate, sodium lauryl sulfate, disodium dodecyl diphenyl ether disulfonate, N-octadecyl disodium sulfosuccinate and dioctyl sodium sulfosuccinate. Such emulsifying agents can be employed in varying amounts but as a general rule, an amount ranging from about 0.01 to about 5 weight percent, based upon the total monomers to be polymerized in the reaction, is advantageously employed.

Other ingredients (e.g. acids, salts, chain transfer agents, chelating agents, etc.) known in the art to be useful for various specific purposes in emulsion polymerization can also be employed. For example, chain transfer agents may be used to regulate the average molecular weight of the polymer. Those preferably used are the long chain alkyl mercaptans such as t-dodecylmercaptan or tridecylmercaptans. Other useful chain transfer agents which can be used include, for example, the lower alkyl xanthogens, alpha-bromoethylbenzene, alpha-chloroethylbenzene and carbon tetrabromide. The amount of chain transfer agent varies according to the activity of the particular agent and is readily determined by one skilled in the art but is generally in an amount of from about 0.05 to about 5 weight percent based upon the total monomers to be polymerized in the reaction.

The manner of combining the aforementioned ingredients in the above-noted individual polymerization reactions can vary. For example, various known monomer feed methods (such as continuous monomer addition, incremental monomer addition or addition in a single charge of the entire amount of monomer to be employed in the individual polymerization stage) can be utilized. Similarly, the entire amount of the aqueous medium (or specific ingredients thereof) can be present in the polymerization vessel before introduction of the desired comonomer mixture. Alternatively, the aqueous medium (or a portion thereof) can be added (continuously or incrementally) during the course of the polymerization.

Polymerization is generally initiated by activation of a water soluble oxidizing agent with a water-soluble reducing agent at a temperature of from 100° to about 20° C. Polymerization is continued by maintaining the agitated emulsified mixture at the selected temperature until the desired conversion of monomer to polymer has been reached, generally from about 70 to about 90 percent conversion.

The polymer formed in each of the aforementioned polymerization reactions comprises from 100 to about 40 weight percent of at least one conjugated diolefin monomer, from 0 to about 60 weight percent of at least one $C_3$ to $C_6$ alkenyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said polymers. The polymer formed in each of the aforementioned polymerization reactions is further characterized in that both the monomer composition and the molecular weight of the polymer formed in one polymerization reaction differs from the monomer composition and the molecular weight of the polymer formed in each of the other polymerization reactions, or the monomer composition of the polymer formed in one polymerization reaction differs from the monomer composition of the polymer formed in each of the other polymerization reactions, or the molecular weight of the polymer formed in one polymerization reaction differs from the molecular weight of the polymer formed in each of the other polymerization reactions. Even further characterization of the polymer is afforded by the fact that the polymer formed in one of the aforementioned polymerization reactions comprises from 5 to 95 weight percent, preferably from 10 to 90 weight percent, of the total polymer formed in all the polymerization reactions. Following the above-described polymerization in the aforementioned individual polymerization reactions, the resulting latex may be stripped of any unreacted monomers and then stabilized for storage by the addition of a small amount of a known stabilizer. Preferably, however, the stripping and stabilization steps are eliminated with respect to the intermediate latex of each polymerization reaction by proceeding directly to the polymerization of the monomer charge to be employed in the subsequent polymerization reaction.

Upon completion of the overall polymerization process, the latex is stripped of unreacted monomers by procedures known in the art and is then subjected to conventional coagulation and drying procedures to afford the polymer of the present invention.

A rubber composition comprising from:
(i) 100 to about 10 parts by weight of a rubbery polymer comprising from about 5 to 55 weight percent of at least one $C_3$ to $C_6$ alkenyl nitrile monomer, from about 40 to 80 weight percent of at least one $C_4$ to $C_8$ conjugated diolefin and from about 5 to 55 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said rubbery polymer characterized in that the polymer comprises polymer particles which have from 2 to 6 domains wherein each domain comprises from 100 to about 40 weight percent of at least one $C_4$ to $C_8$ conjugated diolefin monomer, from 0 to about 60 weight percent of at least one $C_3$ to $C_6$ alkenyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or chlorine or bromine atom for a total of 100 weight percent of said domain, the monomer composition of one domain of each polymer particle differing from the monomer composition of each of the other domains and/or the molecular weight of one domain of each polymer particle differing from the molecular weight of each of the other domains, and any one domain of the polymer particles comprises from about 5 to 95 weight percent of the polymer particles, 0 to about 90 parts by weight of at least one rubber selected from the group consisting of butadiene rubbers, styrenebutadiene random and block rubbery copolymers, isoprene rubber and natural rubber, for a total of 100 parts by weight of (i) and (ii), at least one carbon black, aromatic hydrocarbon extender oil and vulcanization reagents has been found, upon vulcanization to exhibit improved dynamic properties relative to a rubber composition comprising a polymer that has a monomer composition similar to that of the polymer of the present invention but is not comprised of polymer particles having 2 to 6 domains wherein one domain of each of the polymer particles differs from each of the other domains of the polymer particles in monomer composition and/or molecular weight and any one domain of the polymer particles comprises from about 5 to 95 weight percent of the polymer particles.

The rubbery polymer (i) preferably comprises from about 10 to 40 weight percent of at least one $C_3$ to $C_6$ alkenyl nitrile monomer, from about 50 to 70 weight percent of at least one $C_4$ to $C_8$ conjugated diolefin monomer and from about 10 to 40 weight percent of at least one monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said polymer.

Representative nonlimiting examples of $C_3$ to $C_6$ alkenyl nitrile monomers which are suitable for use in the rubbery polymer (i) of the rubber composition include acrylonitrile, methacrylonitrile, 3-butenenitrile and 4-pentenenitrile, acrylonitrile and methacrylonitrile being preferred and acrylonitrile being especially preferred. Suitable $C_4$ to $C_8$ conjugated diolefin monomers include 1,3-butadiene, isoprene, 1,3-pentadiene, 2,3-dimethyl-1,3-butadiene, 2-methyl-1,3-pentadiene and 2,3-dimethyl-1,3-pentadiene, 1,3-butadiene and isoprene being preferred and 1,3-butadiene being especially preferred. Representative nonlimiting examples of $C_8$ to $C_{12}$ monovinylidene aromatic monomers which may be substituted in the alpha position on the vinylidene group with at least one $C_1$ to $C_4$ alkyl group or on the aromatic ring with at least one $C_1$ to $C_4$ alkyl group or a chlorine or bromine atom suitable for use in the present invention include styrene, α-methylstyrene, various alkyl substituted styrenes, 1-vinylnaphthalene, p-chlorostyrene, p-bromostyrene and the like; styrene, α-methylstyrene, p-methylstyrene, p-chlorostyrene and p-bromostyrene being preferred and styrene being especially preferred.

The rubbery polymer (i) suitable for use in the rubber composition of the present invention is comprised of polymer particles which have from 2 to 6 domains, preferably from 2 to 4 domains and any one domain of the polymer particles comprises from about 5 to 95 weight percent of the polymer particles, preferably from about 10 to about 90 weight percent of the polymer particles.

The use of carbon blacks for reinforcement of vulcanizates is well known in the art and results in improved strength properties of the final vulcanizates. Suitable carbon blacks for the practice of this invention include the well known furnace and channel blacks, preferably furnace black, and are used in amounts of from about 30 to about 150 parts by weight based on 100 parts by weight of the total of the rubbery polymer (i) and the rubber (ii).

The use of hydrocarbon extender oil is well known in the art. Aromatic extender oils are preferred for use in the present invention, paraffinic extender oils being incompatible with the rubbery polymer (i), and these aromatic extender oils are used in amounts of from 0 to about 15 parts by weight based on 100 parts by weight of the total of the rubbery polymer (i) and the rubber (ii).

The curing system suitable for use in the present invention is not particularly restricted. A typical curing system comprises: (a) a metal oxide, (b) optionally elemental sulphur and (c) at least one sulphur based accelerator. The use of metal oxides as a component is well known in the art. A suitable metal oxide is zinc oxide, which may be used in amounts of from about 1 to about 10, preferably from about 2 to about 5, parts by weight. Elemental sulphur, comprising component (b) of said curing system, when present may be used in amounts of from about 0.2 to about 3 parts by weight. Suitable sulphur accelerators (component (c) of said curing system) may be used in amounts of from about 0.5 to about 3 parts by weight and include thiuram sulphides such as tetramethyl thiuram disulphide (TMTD), the thiocarbamates such as zinc dimethyl dithiocarbamate (ZDC) and the sulfenamides such as N-cyclohexyl-2-benzothiazole sulfenamide. Preferably the sulphur based accelerator is N-t-butyl-2-benzothiazole-sulfenamide.

Stabilizers, anti-oxidants and tackifiers may also be added as is well known in the art of compounding.

The composition according to the present invention can be prepared by the well known methods for using rubbery polymers including mixing on a rubber mill or in internal mixers of the Banbury or Brabender variety. Generally it is preferred to carry out the compounding procedure in two stages. In the first stage the rubbery polymers (i) and the rubber (ii) may be mixed with conventional compounding ingredients; these may include carbon black, hydrocarbon extender oil, tackifiers, stabilizers, processing aids and antioxidants. In the second stage of the compounding procedure, the cure active agents are preferably added to the compound described above on a rubber mill or in an internal mixer operated at a temperature not normally in excess of about 60° C. The compounds are cured in a conventional manner by heating from about 5 to about 60 minutes at temperatures of from about 150° C. to about 200° C. to form elastomeric vulcanizates.

After vulcanization, the rubber composition hereinbefore described exhibits an improvement in dynamic properties. By an improvement in dynamic properties is meant the tan delta curves of the vulcanizates comprise a vibration damping range that is as wide as possible and in the temperature range from 30° to 70° C. and above 70° C. the tan delta values are relatively low while in the temperature range from 0©to 30° C. the tan delta values are relatively high. Furthermore the maximum tan delta values occur at lower temperatures.

The following examples illustrate the present invention and are not intended to limit the scope thereof.

EXAMPLE 1

Part A Seed Polymer.

A 1 liter glass bottle was charged with a solution of 5.9 g sodium dodecyl sulphonate in 350 g of distilled water adjusted to pH 11.0. To the sealed and nitrogen purged bottle was then added 100 g 1,3-butadiene, 100 g styrene, 0.1 g p-menthane hydroperoxide and 0.62 g dodecyl mercaptan. After the reaction mixture was equilibrated at 15.5° C., the reaction was activated with 0.006 g ferrous sulphate hydrate and the polymerization was allowed to continue until there was 30 percent solids formation (80 percent conversion) at which time the reaction was terminated by the addition of 0.4 g N,N-diethylhydroxylamine. The latex was then steam stripped of unreacted monomer.

A portion of the polymer was recovered by coagulation with calcium chloride followed by filtration. The wet polymer was then dried in an air circulating oven at 160° C. for two hours. Analysis revealed that the recovered polymer contained 41.8 weight percent styrene and 58.2 weight percent butadiene and had a Mooney viscosity (ML 1+4 at 100° C.) of 36.

Part B

A 1 liter glass bottle was charged with the latex from Part A in an amount equivalent to 80 g latex solids, 15 g of an aqueous solution of 10 weight percent sodium dodecyl sulphonate adjusted to pH 11.0, sufficient distilled water to adjust the amount of water charged to 350 g, 24.0 g acrylonitrile, 84.0 g 1,3-butadiene, 12.0 g styrene, 0.1 g p-menthane hydroperoxide and 0.43 g dodecyl mercaptan. After the reaction mixture was equilibrated at 15.5° C., the reaction was activated with 0.006 g ferrous sulphate hydrate and the polymerization was allowed to continue until there was 30 percent solids formation (80 percent overall conversion), at which time the reaction was short-stopped by the addition of 0.4 g N,N-diethylhydroxylamine. The latex was then steam stripped of unreacted monomer.

To the monomer-free latex was added 1 php methylene-binonylated paracresol. The polymer was then recovered by coagulation with calcium chloride followed by filtration and subsequently dried in an air circulating oven at 160° C. for two hours. Analysis revealed that the recovered polymer contained 12.8 weight percent acrylonitrile, 62.9 weight percent butadiene and 24.3 weight percent styrene for a total of 100 weight percent terpolymer.

The dry polymer (100 g) was compounded with 45 g N339 carbon black, 2.0 g NBS stearic acid, 4.0 g NBS zinc oxide, 2.0 g NBS sulphur, 1.3 g N-(1,3-dimethylbutyl)-N¹-phenyl-p-phenylenediamine (Santoflex 13), 1.1 g N-t-butyl-2-benzothiazolesulfenamide (Santocure NS) and 0.4 g diphenylguanidine on a cold mill. The compound was molded into a sheet 0.04 cm by 2.0 cm by 4.0 cm. The sheet was then cured at 150° C. and 2,750 psi pressure for $t_{90}+5$ minutes, $t_9$ being the time required to reach 90 percent of the maximum torque in a Monsanto curemeter.

Figure 1:
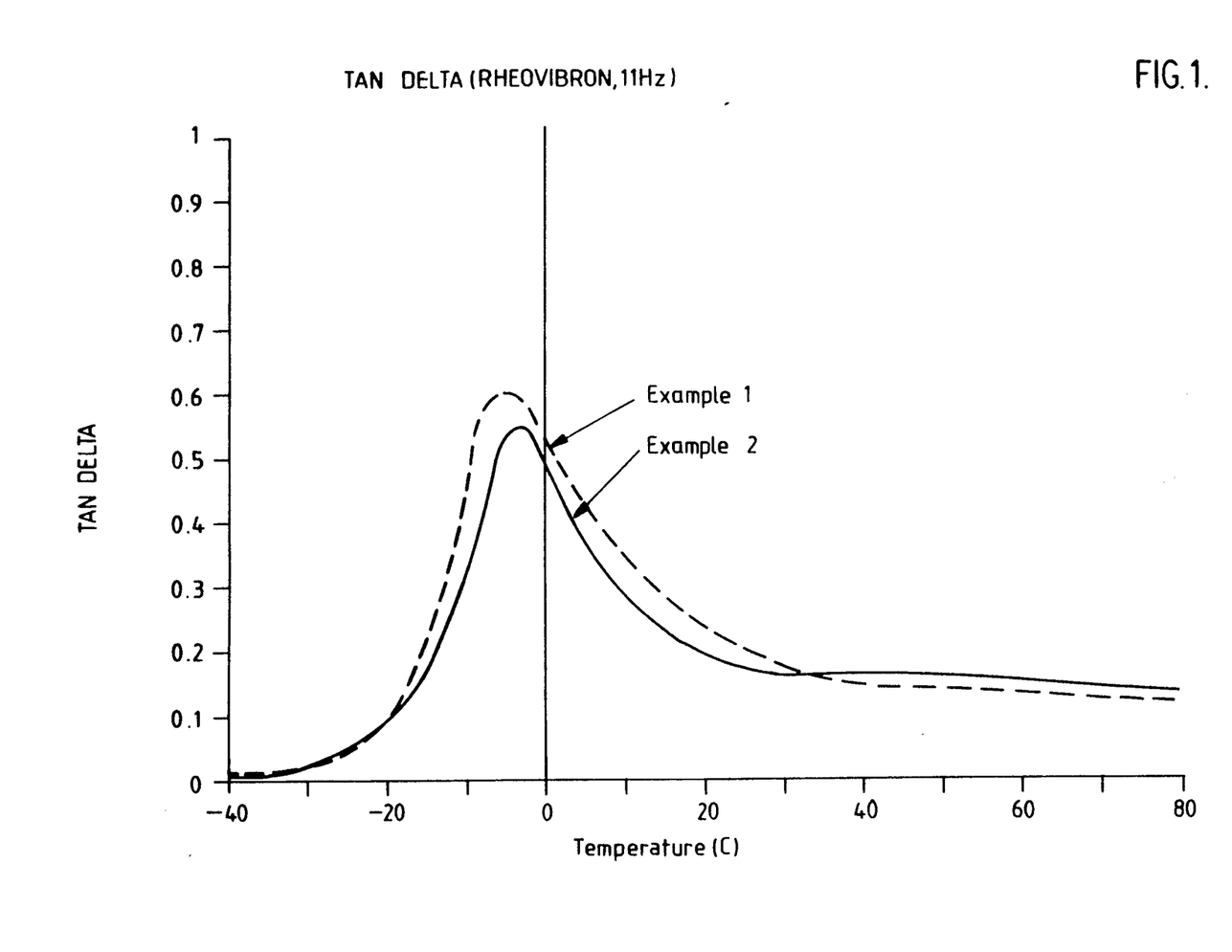
FIGS. 1 to 6 show the variation in tan delta with temperature for vulcanizate (produced in accordance with the invention as well as comparative examples).

A portion of the cured sheet (0.04 cm by 0.4 cm by 3.6 cm) was tested in an Autovibron at 10 percent pre(-static)-strain and 0.5 percent dynamic strain over a frequency range of 1.1 Hz to 110 Hz and a temperature range of −40° C. to 100° C. The resultant tan delta curve is illustrated in FIG. 1.

Example 2 (Comparative)

A 1 liter glass bottle was charged with a solution of 5.9 g sodium dodecyl sulphate in 350 g of distilled water adjusted to pH 11.0. To the sealed and nitrogen purged bottle was then added 40.0 g acrylonitrile, 100 g 1,3-butadiene, 60.0 g styrene, 0.1 g p-methanehydroperoxide and 0.70 g dodecyl mercaptan. After the reaction mixture was equilibrated at 15.5° C., the reaction was activated with 0.006 g ferrous sulphate hydrate and the polymerization was allowed to continue until there was 30 percent solids (80 percent conversion) at which time the reaction was terminated by the addition of 0.4 g N,N-diethylhydroxylamine. The latex was then steam stripped of unreacted monomer.

To the monomer-free latex was added 1 php methylenebinonylated paracresol. The terpolymer was then recovered by coagulation with calcium chloride followed by filtration and subsequently dried in an air circulating oven at 160° C. for two hours. Analysis revealed that the recovered terpolymer contained 12.2 weight percent acrylonitrile, 63.7 weight percent butadiene and 24.1 weight percent styrene for a total of 100 weight percent terpolymer.

The dry terpolymer was then compounded and tested as in Part B Example 1. The resultant tan delta curve is illustrated in FIG. 1.

A comparison of the tan delta curves in FIG. 1 reveals that the tan delta curve of the vulcanizate produced in accordance with Example 1 is wider and has a higher maximum than does the tan delta curve of the vulcanizate produced in accordance with comparative Example 2. In the temperature range of 0° to 30° C., the tan delta values of Example 1 are higher than those of comparative Example 2 indicating superior wet skid resistance, while in the temperature range of 40° to 80° C., the tan delta values of Example 1 are lower than those of comparative Example 2 indicating a reduction in rolling resistance and dynamic heat build up.

EXAMPLE 3

Part A Seed Polymer

The seed polymer was prepared as in Part A Example 1. The polymer contained 41.8 weight percent styrene and 58.2 weight percent butadiene.

Part B

A 1 liter glass bottle was charged with the latex from Part A in an amount equivalent to 80 g latex solids, 15 g of an aqueous solution of 10 weight percent sodium dodecylsulphonate adjusted to pH 11.0, sufficient distilled water to adjust the amount of water charged to 350 g, 36.0 g acrylonitrile, 84.0 g 1,3-butadiene, 0.1 g p-menthane hydroperoxide and 0.46 g dodecyl mercaptan. After the reaction mixture was equilibrated at 15.5°

C., the reaction was activated with 0.006 g ferrous sulphate hydrate and the polymerization was allowed to continue until there was 30 percent solids formation (80 percent overall conversion) at which time the reaction was short-stopped by the addition of 0.4 g N,N-diethylhydroxylamine. The latex was then steam stripped of unreacted monomer.

The terpolymer was then recovered as in Part B Example 1. Analysis indicated that the terpolymer contained 17.1 weight percent acrylonitrile, 62.1 weight percent butadiene and 20.8 weight percent styrene.

The terpolymer was compounded and tested as in Part B Example 1. The resultant tan delta curve is illustrated in FIG. 2.

Figure 2:
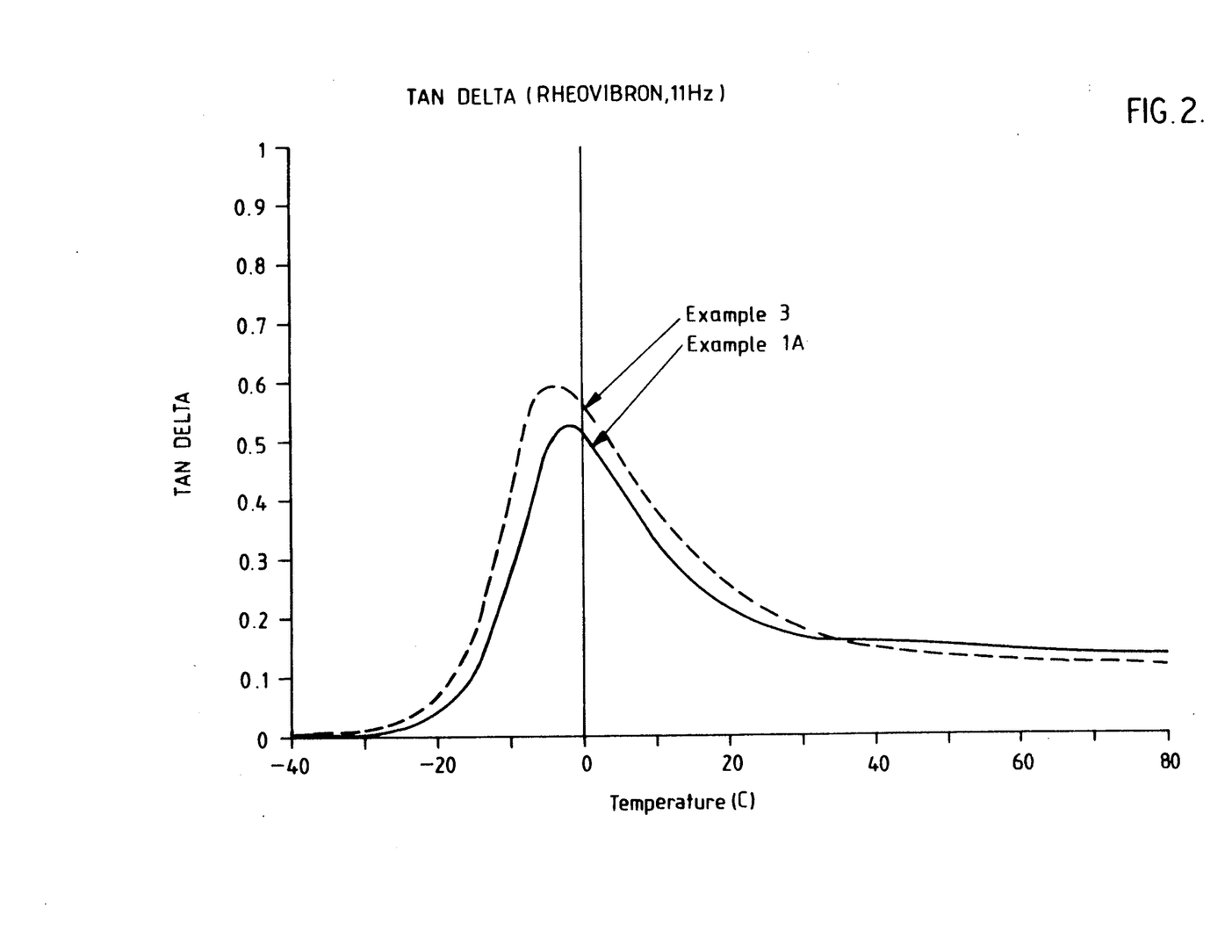

A comparison of the tan delta curves in FIG. 2 shows that the tan delta curve of the vulcanizate produced in accordance with Example 3 is wider and has a higher maximum than does the tan delta curve of the vulcanizate of the seed polymer produced in accordance with Part A Example 1. In the temperature range of 0° C. to 30° C., the tan delta values of Example 3 are higher than those of comparative Example 1A indicating superior wet skid resistance while in the temperature range of 40° to 80° C. the tan delta values of Example 3 are lower than those of comparative Example 1A indicating a reduction in rolling resistance and dynamic heat build up.

These results demonstrate the improvement in physical properties that may be obtained upon the sequential polymerization of the monomers comprising the base polymer, followed by the monomers comprising an acrylonitrile-butadiene copolymer.

EXAMPLE 4

Part A Seed Polymer

The seed polymer was prepared as in comparative Example 2. A portion of the polymer was recovered and upon analysis was found to contain 12.2 weight percent acrylonitrile, 63.7 weight percent butadiene and 241 weight percent styrene for a total of 100 weight percent polymer.

Part B

Using the latex from Part A as the seed, a second terpolymerization was carried out in the manner outlined in Part B Example 1. Analysis of the recovered polymer showed a composition of 22.2 weight percent acrylonitrile, 67.2 weight percent butadiene and 10.6 weight percent styrene for a total of 100 weight percent terpolymer.

The terpolymer was compounded and tested as in Part B Example 1. The resultant tan delta curve is illustrated in FIG. 3.

Figure 3:
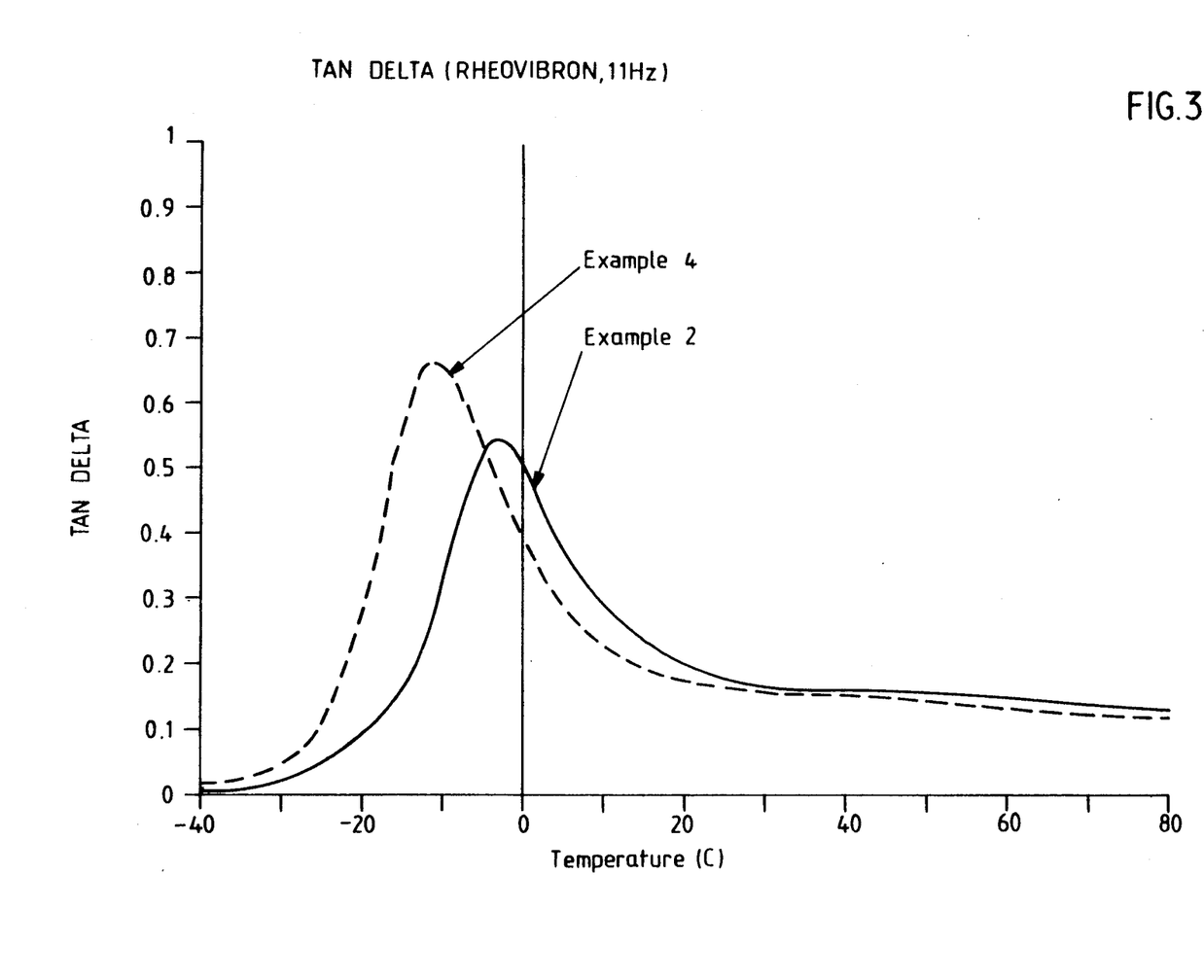

A comparison of the tan delta curves in FIG. 3 shows that the tan delta curve of the vulcanizate produced in accordance with Example 4 is wider and has a higher maximum that is shifted to a lower temperature than does the tan delta curve of the vulcanizate of the seed polymer produced in accordance with comparative Example 2.

These results demonstrate how the low temperature properties of the seed polymer, an acrylonitrile-butadiene-styrene terpolymer may be improved markedly by sequentially polymerizing on the aforesaid terpolymer a second domain comprising another acrylonitrile-butadiene-styrene terpolymer having a composition different to that of the seed polymer, the first domain.

EXAMPLE 5

Part A Seed Polymer

The seed polymer was prepared as in comparative Example 2. A portion of the polymer was recovered and upon analysis was found to contain 12.2 weight percent acrylonitrile, 63.7 weight percent butadiene and 24.1 weight percent styrene for a total of 100 weight percent polymer.

Part B

Using the latex from Part A as the seed, a 1 liter glass bottle was charged with an amount equivalent to 80 g latex solids, 15 g of an aqueous solution of 10 weight percent sodium dodecyl sulphonate adjusted to pH 11.0, sufficient distilled water to adjust the amount of water charged to 350 g, 24.0 g acrylonitrile, 60.0 g 1.3-butadiene and 36.0 g styrene, the aforesaid monomers being in the same ratio as the monomer charge in Part A, 0.1 g p-menthane hydroperoxide and the modifier 0.28 g dodecyl mercaptan which was at a lower level relative to the monomer charge than in Part A. After the reaction mixture was equilibrated at 15.5° C., the reaction was activated with 0.006 g ferrous sulphate hydrate and the polymerization was allowed to continue until there was 30 percent solids formation (80 percent overall conversion) at which time the reaction was short-stopped by the addition of 0.4 g N,N-diethylhydroxylamine. The latex was then steam stripped of unreacted monomer.

The terpolymer was then recovered as in Part B Example 1. Analysis indicated that the terpolymer contained 10.8 weight percent acrylonitrile, 63.8 weight percent butadiene and 25.4 weight percent styrene for a total of 100 weight percent polymer. The Mooney viscosity of the massed terpolymer (ML 1+4 at 100° C.) was 58 whereas the Mooney viscosity of the seed terpolymer (ML 1+4 at 100°) was 36 indicating that while the monomer composition of the second domain was essentially the same as that of the first domain, the molecular weight of the second domain was higher than that of the first domain. This was to be expected as the amount of modifier relative to the monomer charge in the second terpolymerization was lower than the amount of modifier relative to the monomer charge in the first terpolymerization. It was not possible to determine the molecular weight of the terpolymer by gel permeation chromatography as no suitable solvent could be found for the terpolymer.

The terpolymer was then compounded and tested as in Part B Example 1. The resultant tan delta curve is illustrated in FIG. 4.

Figure 4:
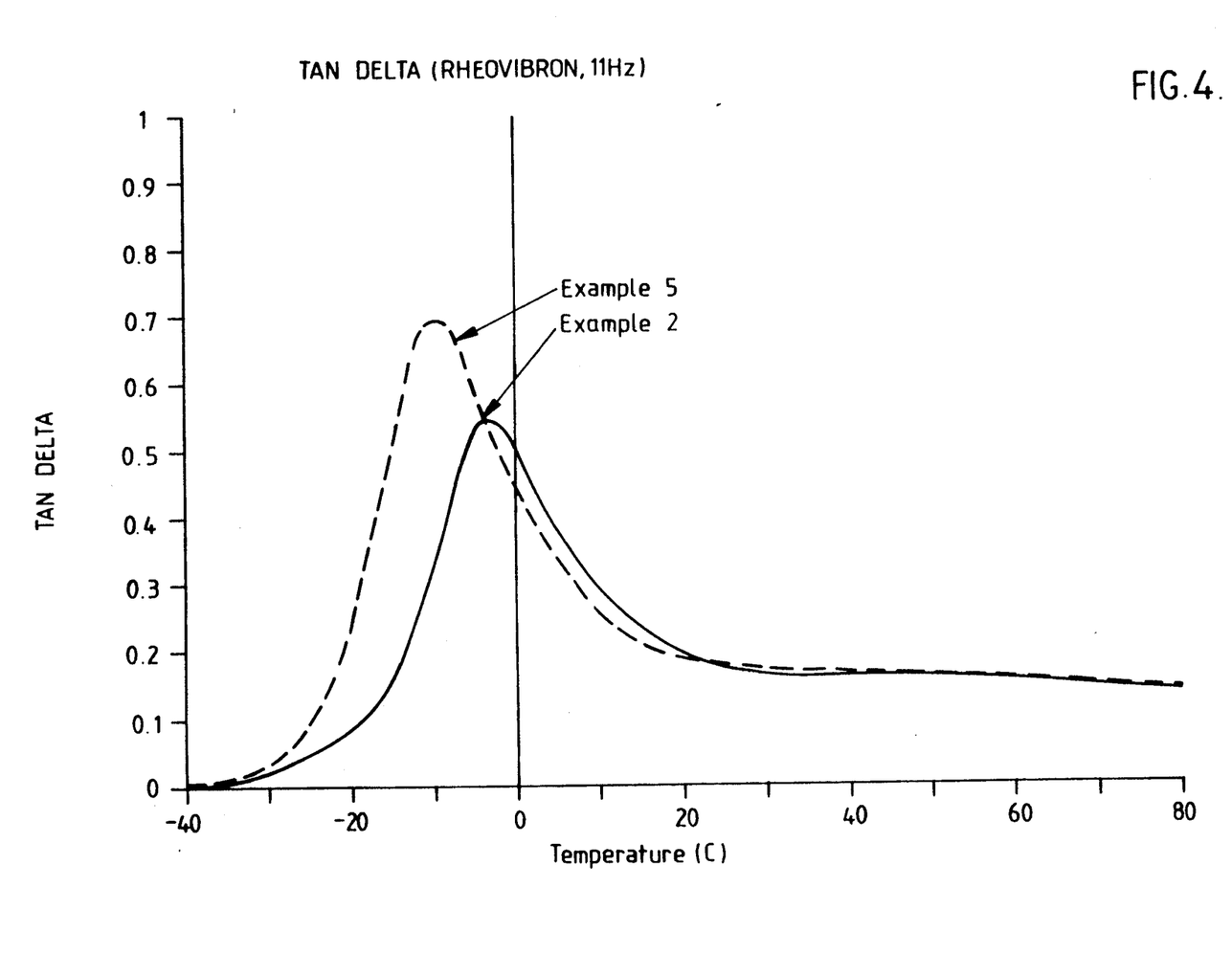

A comparison of the tan delta curves in FIG. 4 shows that the tan delta curve of the vulcanizate produced in accordance with Example 5 is wider and has a higher maximum that is shifted to a lower temperature than does the tan delta curve of the vulcanizate of the seed polymer produced in accordance with comparative Example 2.

The results also demonstrate how the low temperature properties of the seed acrylonitrilebutadiene-styrene terpolymer can be improved by the sequential polymerization on the seed particles of a second domain comprising an acrylonitrile-butadienestyrene terpolymer having the same composition as that of the seed terpolymer but a higher molecular weight than that of the seed terpolymer. A comparison of these results with those illustrated in FIG. 3 demonstrates the variation in properties that may be obtained by varying the composition or the molecular weight of the second domain. For while the low temperature properties of the vulcanizate produced in accordance with Example 5 have been improved there has not been a concomitant reduction in the wet skid properties as there has been in the vulcanizate produced in accordance with Example 4.

EXAMPLE 6

Part A Seed Polymer

A 1 liter glass bottle was charged with a solution of 5.9 g sodium dodecyl sulphonate in 350 g of distilled water adjusted to pH 11.0. To the sealed and nitrogen purged bottle was then added 40.0 g acrylonitrile, 120.0 g 1,3-butadiene, 40.0 g styrene, 0.1 g p-methane hydroperoxide and 0.72 g dodecyl mercaptan. After the reaction mixture was equilibrated at 15.5° C., the reaction was activated with 0.006 g ferrous sulphate hydrate and the polymerization was allowed to continue until there was 30 percent solids formation (80 percent conversion) at which time the reaction was terminated by the addition of 0.4 g N,N-diethylhydroxylamine. The latex was then steam stripped of unreacted monomer. A portion of the polymer was recovered and upon analysis was found to contain 21.0 weight percent acrylonitrile, 63.0 weight percent butadiene and 23.0 weight percent styrene for a total of 100 weight percent polymer.

Part B

A 1 liter glass bottle was charged with the latex from Part A in an amount equivalent to 80 g latex solids, 15 g of an aqueous solution of 10 weight percent sodium dodecyl sulphonate adjusted to pH 11.0, sufficient distilled water to adjust the amount of water charged to 350 g, 12.0 g acrylonitrile, 72.0 g 1,3-butadiene, 36.0 g styrene, 0.1 g p-menthane hydroperoxide and 0.41 g dodecyl mercaptan. After the reaction mixture was equilibrated at 15.5° C., the reaction was activated with 0.006 g ferrous sulphate hydrate and the polymerization was allowed to continue until there was 30 percent solids formation (80 percent overall conversion) at which time the reaction was short-stopped by the addition of 0.4 g N,N-diethylhydroxylamine. The latex was then steam stripped of unreacted monomer. Analysis of the recovered polymer showed a composition of 17.4 weight percent acrylonitrile, 61.7 weight percent butadiene and 20.9 weight percent styrene for a total of 100 weight percent polymer.

Figure 5:
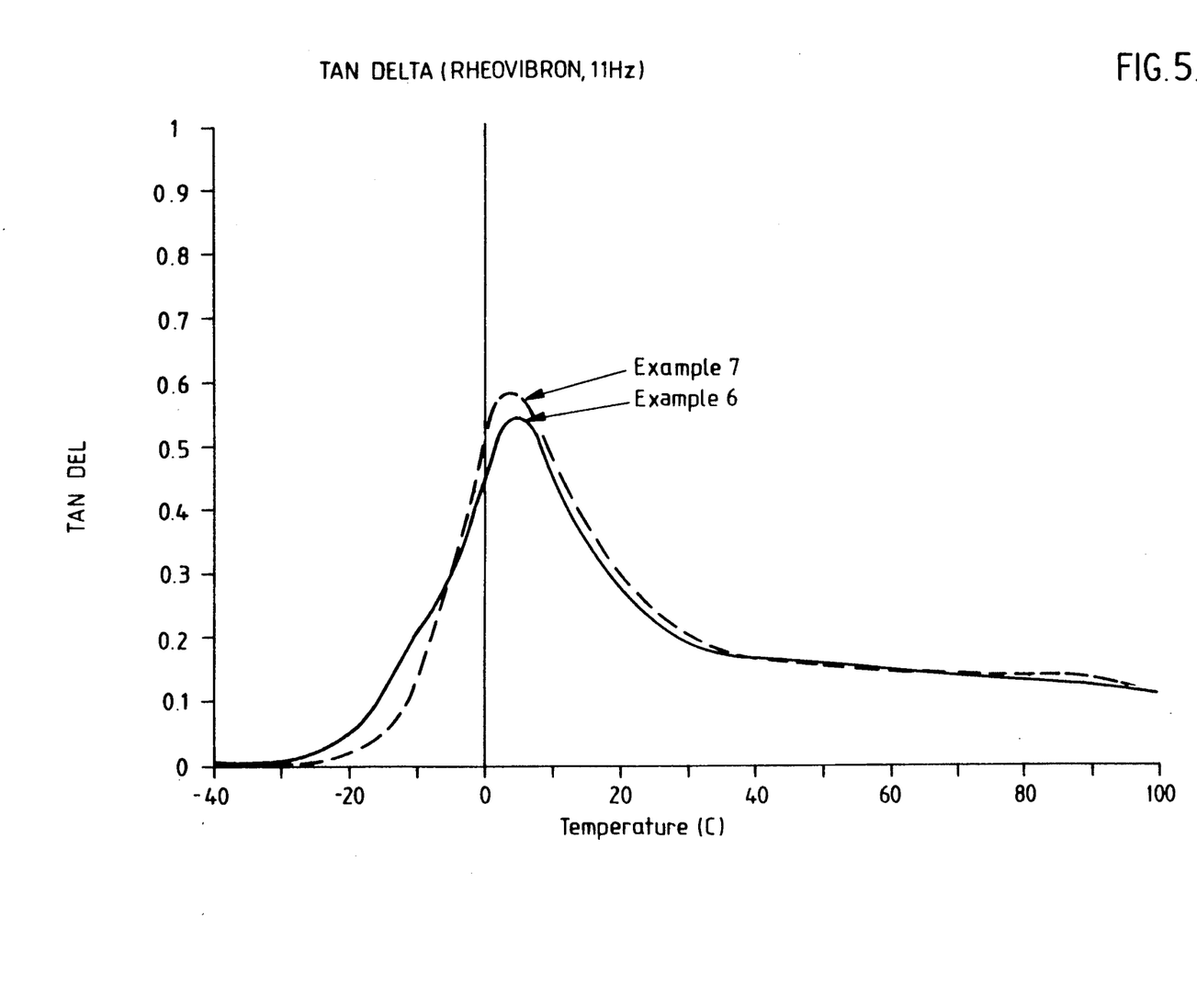

The terpolymer was compounded and tested as in Part B Example 1. The resultant tan delta curve is illustrated in FIG. 5.

EXAMPLE 7

A terpolymer with essentially the same composition as the terpolymer in Example 6 was prepared on a larger scale in a pilot plant in the following manner.

To a 400 liter reactor equipped with jacketed cooling and a variable speed agitator having two sets of turbo blades there was charged a solution of 4.6 kg sodium dodecyl sulphonate in 278.1 kg water adjusted to pH 11.0, 31.78 kg. acrylonitrile, 95.34 kg 1,3-butadiene, 31.78 kg styrene and 633.7 g dodecyl mercaptan. After the reaction mixture had been equilibrated at 15.5° C., the reaction was initiated by the addition of 79.5 g p-menthane hydroperoxide and activated by the addition of 9.6 g ferrous sulphate hydrate. Polymerization was allowed to continue until there was 80 percent overall conversion (30 percent solids formation), at which time a further solution of 26 kg sodium dodecyl sulphonate in 27.81 kg water, 17.8 kg acrylonitrile, 89.6 kg, 1,3-butadiene, 51.5 kg styrene and 528.7 g dodecyl mercaptan were charged to the reaction mixture. The reaction was then reinitiated by the addition of 79.5 g p-menthane hydroperoxide and activated by the addition of 9.6 g ferrous sulphate hydrate. Polymerization was allowed to continue until there was 80 percent overall conversion (30 percent solids formation) and then the reaction was short-stopped by the addition of 318 g N,N-diethylhydroxylamine. Unreacted monomers were then removed by stripping with steam.

Analysis indicated that the recovered polymer had a composition of 17.6 weight percent acrylonitrile, 61.7 weight percent butadiene and 20.7 weight percent styrene for a total of 100 weight percent polymer A portion of the recovered polymer was compounded and tested as in Part B Example 1. The resultant tan delta curve is illustrated in FIG. 5.

The results indicate that the vulcanizate of the terpolymer produced in the pilot plant (Example 7) exhibits similar dynamic behaviour to the vulcanizate of the terpolymer produced on the small scale (Example 6).

EXAMPLE 8

Latex solids (100 g) prepared according to comparative Example 2 were blended with latex solids (100 g) prepared according to Part A, Example 1. The polymer blend was then recovered using the procedure described in Part B, Example 1.

Analysis indicated that the recovered polymer blend had a composition of 5.2 weight percent acrylonitrile, 61.1 weight percent butadiene and 33.7 weight percent styrene for a total of 100 weight percent of polymer blend.

Figure 6:
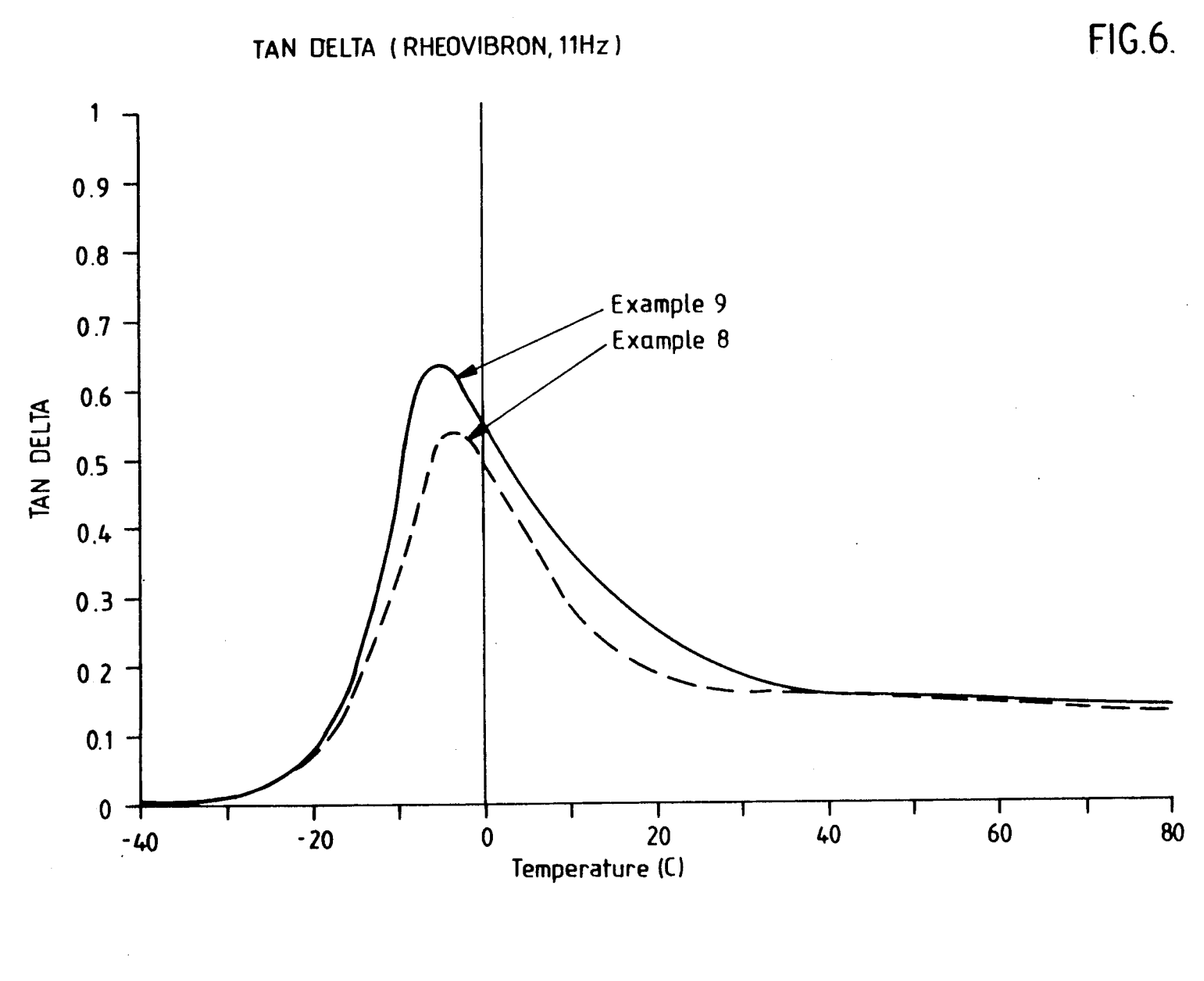

A portion of the recovered polymer blend was compounded and tested as in Part B, Example 1. The resultant tan delta curve is illustrated in FIG. 6.

EXAMPLE 9

Part A Seed Polymer

The seed polymer was prepared as in Part A, Example 1.

Part B

A 1 liter glass bottle was charged with the latex from Part A in an amount equivalent to 80 g latex solids, 15 g of an aqueous solution of 10 weight percent sodium dodecyl sulphonate adjusted to pH 11.0, sufficient distilled water to adjust the amount of water charged to 350 g, 12.0 g acrylonitrile, 72.0 g 1,3-butadiene, 36.0 g styrene, 0.1 g p-menthane hydroperoxide and 0.41 g dodecyl mercaptan. After the reaction mixture was equilibrated at 15.5° C., the reaction was activated with 0.006 g ferrous sulphate hydrate and the polymerization was allowed to continue until there was 30 percent solids formation (80 percent overall conversion) at which time the reaction was short-stopped by the addition of 0.4 g N,N-diethylhydroxylamine. The latex was then steam stripped of unreacted monomers.

The terpolymer was then recovered as in Part B Example 1. Analysis indicated that the terpolymer contained 6.8 weight percent acrylonitrile, 65.6 weight percent butadiene and 27.6 weight percent styrene.

The terpolymer was compounded and tested as in Part B Example 1. The resultant tan delta curve is illustrated in FIG. 6.

A comparison of the tan delta curves in FIG. 6 reveals that the tan delta curve of the vulcanizate produced in accordance with Example 9 is broader and has a higher maximum than does the tan delta curve of the vulcanizate of the blend of the two latices having different monomer compositions produced in accordance with Example 8.

EXAMPLE 10

Part A Seed Polymer

A 1 liter glass bottle was charged with a solution of 5.9 g sodium dodecyl sulphonate in 350 g of distilled water adjusted to pH 11.0. To the sealed and nitrogen purged bottle was then added 120.0 g acrylonitrile, 80.0 g 1,3-butadiene, 0.1 g p-menthane hydroperoxide and 0.72 g dodecyl mercaptan. After the reaction mixture was equilibrated at 15.5° C, the reaction mixture was activated with 0.006 g ferrous sulphate hydrate and the polymerization was allowed to continue until there was 30 percent solids formation (80 percent conversion) at which time the reaction was terminated by the addition of 0.4 g N,N-diethyl hydroxylamine. The latex was then steam stripped of unreacted monomer.

A portion of the polymer was recovered and upon analysis was found to contain 46.2 weight percent acrylonitrile and 53.8 weight percent butadiene for a total of 100 weight percent polymer.

Part B

A 1 liter glass bottle was charged with the latex from part A in an amount equivalent to 40 g latex solids, 15 g of an aqueous solution of 10 weight percent sodium dodecyl sulphonate adjusted to pH 11.0, sufficient distilled water to adjust the amount of water charged to 350 g, 80.0 g 1,3-butadiene, 80.0 g styrene, 0.1 g p-methane hydroperoxide and 0.51 g dodecyl mercaptan. After the reaction mixture was equilibrated at 15.5° C., the reaction was activated with 0.006 g ferrous sulphate hydrate and the polymerization was allowed to continue until there was 30 percent solids formation (80 percent overall conversion), at which time the reaction was short-stopped by the addition of 0.4 g N,N-diethylhydroxylamine. The latex was then steam stripped of unreacted monomer.

A portion of the terpolymer was recovered and upon analysis was found to contain 11.2 weight percent acrylonitrile, 60.8% weight percent butadiene and 28.0 weight percent styrene for a total of 100 weight percent polymer.

Part C

A 1 liter glass bottle was charged with the latex from Part B in an amount equivalent to 96.0 g latex solids, 15 g of an aqueous solution of 10 weight percent sodium dodecyl sulphonate adjusted to p 11.0, sufficient distilled water to adjust the amount of water charged to 350 g, 15.6 g acrylonitrile, 88.4 g 1,3-butadiene 0.1 g p-menthane hydroperoxide and 0.30 g dodecyl mercaptan. After the reaction mixture was equilibrated at 15.5° C., the reaction mixture was activated with 0.006 g ferrous sulphate hydrate and the polymerization was allowed to continue until there was 30 percent solids formation (80 percent conversion) at which time the reaction was terminated with 0.4 g N,N-diethylhydroxylamine. The latex was then steam stripped of unreacted monomer.

The terpolymer was then recovered as in Part B Example 1. analysis indicated that the terpolymer contained 14.0 weight percent acrylonitrile, 67.3 weight percent butadiene and 18.7 weight percent styrene for a total of 100 weight percent terpolymer.

The terpolymer was compounded and tested as in Part B Example 1.

EXAMPLE 11 (COMPARATIVE)

Part A

A latex was prepared according to Example 10 Part A. The copolymer had a composition of 46.2 weight percent acrylonitrile and 53.8 percent butadiene for a total of 100 weight percent of the copolymer.

Part B

A latex was prepared according to Example 10 Part A with the exception that the monomers charged comprised 100.0 g butadiene and 100.0 g styrene and the molecular weight modifier used was 0.64 g dodecyl mercaptan.

A portion of the copolymer was recovered and analysis indicated that the copolymer had a composition of 54.2 weight percent butadiene and 45.8 weight percent styrene for a total of 100 weight percent of the copolymer.

Part C

A latex was prepared according to Example 10 Part A with the exception that the monomers charged comprised 30.0 g acrylonitrile and 170.0 g 1,3-butadiene and 0.58 g dodecyl mercaptan was used.

A portion of the copolymer was recovered and analysis indicated that the copolymer had a composition of 16.6 weight percent acrylonitrile and 83.4 weight percent butadiene for a total of 100 weight percent of the copolymer.

The latices from Parts A, B and C were stripped and blended in the ratio 15A:45B:40C based on the polymer solids. The polymer blend was then recovered using the procedure described in Example 1, Part B.

Analysis indicated that the recovered polymer blend had a composition of 12.4 weight percent acrylonitrile, 68.5 weight percent butadiene and 19.1 weight percent styrene for a total of 100 weight percent of the polymer, a composition similar to that of the terpolymer produced in accordance with Example 10.

A portion of the recovered polymer blend was then compounded and tested as in Example 1, Part B.

A comparison of the delta curves of the vulcanizates produced in accordance with Examples 10 and 11 reveals that of Example 10 is broader and the two maxima in the regions of −10° C. and +5° C. respectively are considerably higher than is the case with the tan delta curve of the vulcanizate of the blend of the three latices.

What is claimed is:

1. A rubbery polymer suitable for use in tire treads comprising from about 5 to 55 weight of at least one $C_3$ to $C_6$ alkenyl nitrile monomer, from about 40 to 80 weight percent of at least one $C_4$ to $C_8$ conjugated diolefin monomer and from about 5 to 55 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or a bromine atom for a total of 100 weight percent of said rubbery polymer characterized in that the polymer comprises polymer particles which have from 2 to 6 domains wherein each domain comprises from 100 to about 40 weight percent of at least one $C_4$ to $C_8$ conjugated diolefin monomer, from 0 to about 60 weight percent of at least one $C_3$ to $C_6$ alkenyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said domain, the monomer composition of one domain of the polymer particles differing from the monomer composition of the other domains and/or the molecular weight of one domain of the polymer particles differing from the molecular weight of the other domains, and any one domain of the polymer particles comprises from about 5 to 95 weight percent of the polymer particles.

2. The rubbery polymer according to claim i comprising from about 10 to 40 weight percent of at least one $C_3$ to $C_6$ alkenyl nitrile monomer, from about 50 to 70 weight percent of at least one $C_4$ to $C_8$ conjugated diolefin monomer and from about 10 to 40 weight percent of at least one monovinylidene aromatic monomer for a total of 100 weight percent of said rubbery polymer.

3. The rubbery polymer according to claim 2 characterized in that the polymer comprises polymer particles which have from 2 to domains.

4. The rubbery polymer according to claim 3 characterized in that any one domain of the polymer particles comprises from about 10 to 90 weight percent of the polymer particles.

5. The rubbery polymer according to claim 4 wherein the $C_3$ to $C_6$ alkenyl nitrile monomer is selected from the group consisting of acrylonitrile and methacrylonitrile, the $C_4$ to $C_8$ conjugated diolefin monomer is selected from the group consisting of 1,3-butadiene and isoprene and the $C_8$ to $C_{12}$ monovinylidene aromatic monomer is selected from the group consisting of styrene, α-methylstyrene, p-methylstyrene, p-chlorostyrene and p-bromostyrene.

6. The rubbery polymer according to claim 5 wherein the $C_3$ to $C_6$ alkenyl nitrile monomer is acrylonitrile, the $C_4$ to $C_8$ conjugated diolefin monomer is 1,3-butadiene and the $C_8$ to $C_{12}$ monovinylidene aromatic monomer is styrene.

7. A process for the preparation of a rubbery polymer comprising from about 5 to 55 weight percent of at least one $C_3$ to $C_6$ alkenyl nitrile monomer, from about 40 to 80 weight percent of at least one $C_4$ to $C_8$ conjugated diolefin monomer and from about 5 to 55 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said rubbery polymer characterized in that the process comprises from 2 to 6 sequential free radical polymerization reactions in aqueous emulsion wherein the polymer formed in each polymerization reaction comprises from 100 to about 40 weight percent of at least one conjugated diolefin monomer, from 0 to about 60 weight percent of at least one $C_3$ to $C_6$ alkenyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said polymer, the monomer composition of the polymer formed in one polymerization reaction differing from the monomer composition of the polymer formed in each of the other polymerization reactions and/or the molecular weight of the polymer formed in one polymerization reaction differing from the molecular weight of the polymer formed in each of the other polymerization reactions, and the polymer formed in one polymerization reaction comprising from 5 to 95 weight percent of the total polymer formed.

8. The process of claim 7 wherein the rubbery polymer comprises from about 10 to 40 weight percent of at least one $C_3$ to $C_6$ alkenyl nitrile monomer, from about 50 to 70 weight percent of at least one $C_4$ to $C_8$ conjugated diolefin monomer and from about 10 to 40 weight percent of at least one $C_8$ to $C_{12}$ monovinylidene aromatic monomer for a total of 100 weight percent of said rubbery polymer.

9. The process of claim 8 comprising from 2 to 4 sequential free radical polymerization reactions in aqueous emulsion.

10. The process of claim 9 wherein the polymer formed in one polymerization reaction comprises from about 10 to about 90 weight percent of the total polymer formed.

11. The process of claim 10 wherein the $C_3$ to $C_6$ alkenyl nitrile monomer is selected from the group consisting of acrylonitrile and methacrylonitrile, the $C_4$ to $C_8$ conjugated diolefin monomer is selected from the group consisting of 1,3-butadiene and isoprene and the $C_8$ to $C_{12}$ monovinylidene aromatic monomer is selected from the group consisting of styrene, —αmethylstyrene, p-methylstyrene, p-chlorostyrene and p-bromostyrene.

12. The process of claim 11 wherein the $C_3$ to $C_6$ alkenyl nitrile monomer is acrylonitrile, the $C_4$ to $C_8$ conjugated diolefin monomer is 1,3-butadiene and the $C_8$ to $C_{12}$ monovinylidene aromatic monomer is styrene.

13. A rubber composition the vulcanizate of which has improved dynamic properties comprising:
(i) 100 to about 10 parts by weight of a rubbery polymer comprising from about 5 to 55 weight percent of at least one $C_3$ to $C_6$ alkenyl nitrile monomer, from about 40 to 80 weight percent of at least one $C_4$ to $C_8$ conjugated diolefin and from about 5 to 55 weight percent of at least one $C_8$ to $C_{12}$ monovinylidene aromatic monomer which may be substituted in the alpha position on the vinylidene group with at least one $C_1$ to $C_4$ group or on the aromatic ring with at least one $C_1$ to $C_4$ alkyl group or a chlorine or bromine atom for a total of 100 weight per cent of said rubbery polymer characterized in that the polymer comprises polymer particles which have from 2 to 6 domains wherein each domain comprises from 100 to about 40 weight percent of at least one $C_4$ to $C_8$ conjugated diolefin monomer, from 0 to about 60 weight percent of at least one $C_3$ to $C_6$ alkenyl nitrile monomer and from 0 to about 60 weight percent of at least one $C_8$ to $C_{12}$ monovinylidene aromatic monomer which may be substituted in the alpha position on the vinylidene group with at least one $C_1$ to $C_4$ alkyl group or on the aromatic ring with at least one $C_1$ to $C_4$ alkyl group or a chlorine or bromine atom for a total of 100 weight percent of said domain, the monomer composition of one domain of the polymer particles differing from the monomer composition of the other domains and/or the molecular weight of one domain of the polymer particles differing from the molecular weight of the other domains, and any one domain of the polymer particles comprises from about 5 to 95 weight percent of the polymer particles, (ii) 0 to about 90 parts by weight of at least one rubber selected from the group consisting of butadiene rubbers, styrenebutadiene random and block rubbery copolymers, isoprene rubber and natural . rubber, for a total of 100 parts by weight of (i) and (ii), (iii) about 30 to about 150 parts by weight of at least one carbon black based on 100 parts by weight of the total of (i) and (ii), (iv) 0 to about 50 parts by weight of aromatic hydrocarbon extender oil based on 100 parts by weight of the total of (i) and (ii), and (v) vulcanization reagents.

14. The rubber composition of claim 13 wherein the rubbery polymer (i) comprises from about 10 to 40 weight percent of at least one $C_3$ to $C_6$ alkenyl nitrile monomer, from about 50 to 70 weight percent of at least one $C_4$ to $C_8$ conjugated diolefin monomer and from about 10 to 40 weight percent of at least one monovinylidene aromatic monomer for a total of 100 weight percent of said rubbery polymer.

15. The rubber composition of claim 14 wherein the rubbery polymer (i) Comprises polymer particles which have from 2 to 4 domains.

16. The rubber composition of claim 15 wherein the rubbery polymer (i) is characterized in that any one domain of the polymer particles comprises from about 10 to 90 weight percent of the polymer particles.

17. The rubber composition of claim 16 wherein the rubbery polymer (i) is characterized in that the $C_3$ to $C_6$ alkenyl nitrile monomer is selected from the group consisting of acrylonitrile and methacrylonitrile, the $C_4$ to $C_8$ conjugated diolefin monomer is selected from the group consisting of 1,3-butadiene and isoprene and the $C_8$ to $C_{12}$ monovinylidene aromatic monomer is selected from the group consisting of styrene, $\alpha$-methylstyrene, p-methylstyrene, p-chlorostyrene and p-bromostyrene.

18. The rubber composition of claim 17 wherein the rubbery polymer (i) is characterized in that the $C_3$ to $C_6$ alkenyl nitrile monomer is acrylonitrile, the $C_4$ to $C_8$ conjugated diolefin monomer is 1,3-butadiene and the $C_8$ to $C_{12}$ monovinylidene aromatic monomer is styrene.

19. The rubber composition of claim 17 wherein said vulcanization reagents comprise from about 1 to about 10 parts by weight of zinc oxide, from about 0.2 to about 3 parts by weight of elemental sulphur and from about 0.5 to about 3 parts by weight of at least one sulphur based accelerator.

20. The rubber composition of claim 19 wherein the amount of zinc oxide is from about 2 to about 5 parts by weight.

* * * * *